Nov. 27, 1956 A. S. RITTER 2,771,709
PLANTING AND EQUIPMENT THEREFOR
Filed April 9, 1954
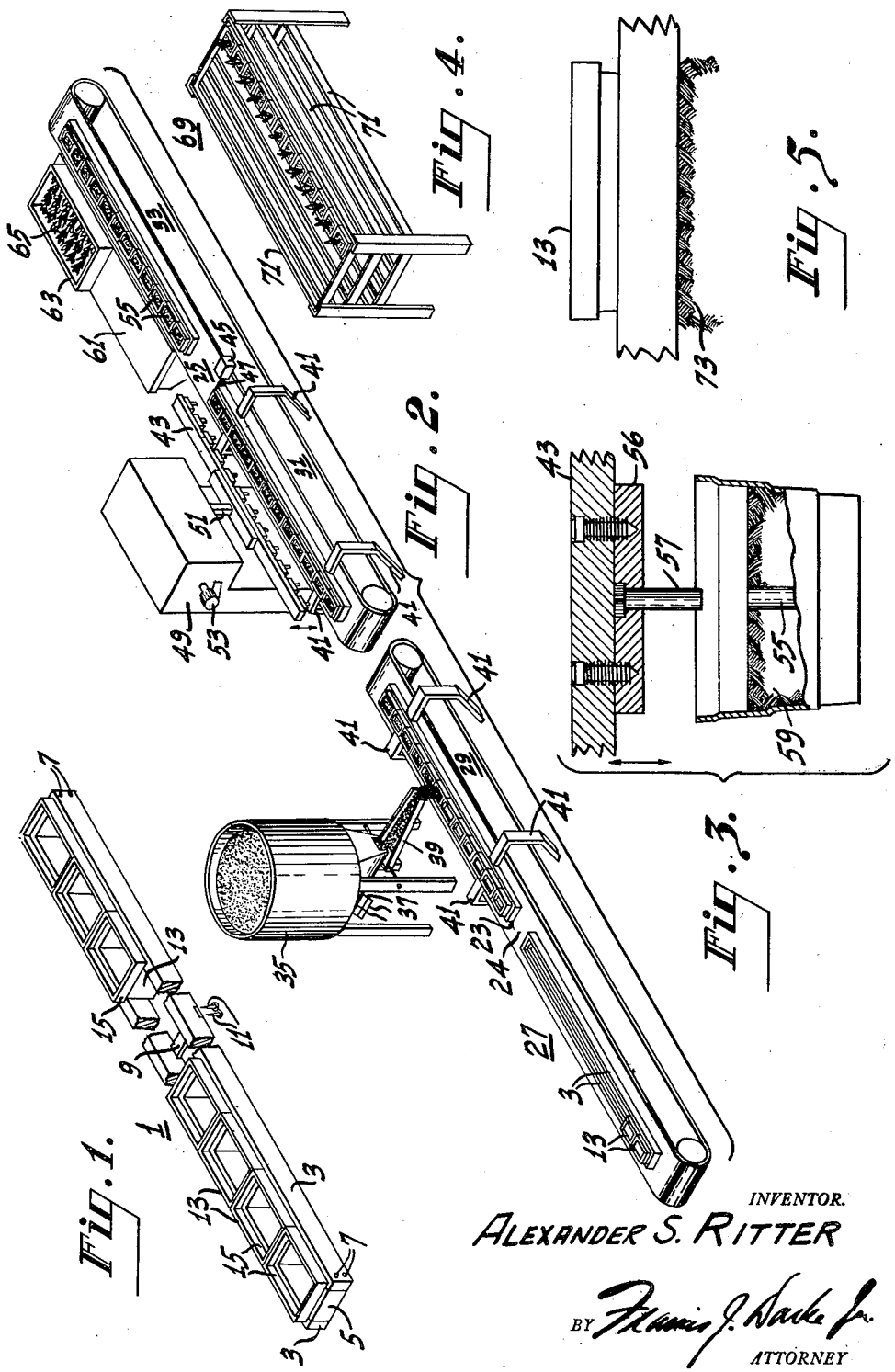
INVENTOR.
ALEXANDER S. RITTER
BY *Francis J. Darke Jr.*
ATTORNEY United States Patent Office 2,771,709
Patented Nov. 27, 1956

2,771,709

PLANTING AND EQUIPMENT THEREFOR

Alexander S. Ritter, Brielle, N. J.

Application April 9, 1954, Serial No. 422,199

5 Claims. (Cl. 47—1)

This invention relates generally to the production of plants cuttings, clippings, seedlings and the like, and more particularly to the planting and the commercial handling of cuttings, clippings, seedlings and the like and the equipment therefor.

Heretofore it has been common practice in the field of horticulture to produce plants from cuttings and the like.

Cuttings or slips are detached pieces of plants taken for the purpose of producing new plants. Under proper conditions they root readily and produce larger plants more quickly than would seed, making it possible to increase plant stocks rapidly. As the resulting new plants are true to type, that is, identical to those from which the cuttings were taken, desirable varieties can be maintained.

The usual method of raising plants from cuttings consists of first planting the cuttings in a flat or a propagating bench. The flat is a wooden tray 15" by 20" by 2". The propagating bench is usually fixed in position.

As soon as the clipping has rooted itself it is transplanted by hand into plant pots or another growing location.

It will be seen therefore that the usual method of raising potted plants necessitates the transplanting by hand of the rooted plants at least twice. The conventional wooden trays or flats and hot house beds do not lend themselves to automatic materials handling.

A primary object of this invention is to provide an improved method and means for the mass production of plants from cuttings, clippings, seedlings, and the like.

Another object of this invention is to reduce the amount of handling necessary for the production of potted plants.

Still another object of this invention is to provide equipment suitable for handling a plurality of plant pots at one time.

According to this invention a pot carrier is provided whose dimension and shape is arranged to handle a plurality of plant pots in line. The pot carrier is arranged to be carried by one or more moving belts positioned to carry the pot carrier from one station to another, whereby at a first station each pot is filled with suitable soil, at a second station the soil is compressed in the pots and a hole is put in the center of the soil for the insertion at the third station of the cuting or the like. The particular size and shape of the carrier permits easy handling and storage of the planted pots on suitable racks with proper spacing of the plants within the carrier to encourage and permit rapid growth. In accordance with another form of the invention more than one row of carriers is carried by the conveyor belts.

Other and incidental objects of the invention will become apparent after a reading of the following specification considered in connection with the attached drawing in which:

Figure 1 shows a plant pot carrier constructed in accordance with the teachings of this invention.

Figure 2 is a perspective view of one embodiment of a a production line developed in accordance with the teachings of this invention.

Figure 3 illustrates in cross section a soil compression member and an associated plant pot.

Figure 4 shows in perspective a rack for storing planted pots;

Figure 5 shows the height of the plant pot carrier with respect to the height of the plant pot.

Referring now in more detail to Figure 1, there is shown a plant pot carrier 1 consisting of a frame having two longitudinal members 3 and end members 5 held together in the form of a rectangle by nails or other suitable fasteners 7.

At substantially the midpoint of the long dimension of the bottom of the frame there is added a restraining member 9, held in place by fasteners 11. The restraining member 9 keeps the longitudinal members 3 in a parallel relationship.

It will be noted that there is no bottom to the plant pot carrier 1. The height of the carrier 1, i. e. the height of longitudinal members 3 and end members 5 is such that the plant pots 13 extend below the frame.

When the plant pot carrier 1 containing pots 13 is put on a flat surface the pots 13 will rest on the flat surface rather than on the frame of the carrier 1. If, however, the carrier 1 is raised from the flat surface, the pots 13 will be supported by the plant pot flange or collar 15 of the pots 13 resting on the longitudinal members 3.

It is important to locate and properly shape the restraining member 9 so that it will lie between two of the pots 13 at or near the center of the frame. Restraining member 9 must therefore be narrow enough to fit between two pots whose plant pot collars 15 are touching each other. This will permit the plant pots 13 to fit snugly in the carrier 1. If the plant pot carrier 1 is designed to carry an odd number of pots the restraining member 9 will be offset from the center of the frame by approximately one-half the length of the pot 13.

Turning now to Figure 2, there is shown a production line for planting cuttings and the like.

A two section conveyor belt 24 and 25 carries the loaded plant pot carriers 23 from the carrier loading station 27, past the plant pot filling station 29, past the soil compressing station 31 and on to the planting station 33.

At the carrier loading station 27 an operator is supplied with plant pot carriers and plant pots. The operator loads the plant pot carriers 1 with plant pots 13 and places the loaded plant pot carriers on the moving belt 24.

Belt 24 moves continuously to carry the loaded plant pot carriers 1 to station 29 where the plant pots 13 are filled with soil.

At the plant pot filling station 29 there is arranged a hopper 35 which receives well screened plant potting soil. The potting soil formula must be thoroughly mixed and screened. The mixing and screening must be done before the potting soil is added to the hopper 35.

Hopper 35 is provided with an electrical vibrator 37 which vibrates hopper 35 to prevent the soil in hopper 35 from jamming and permits a regular flow of soil to the vibrating trough 39 arranged to feed the potting soil to the row of plant pots in the plant pot carriers carried by belt 29.

Vibrating feeders which are commercially available under various trade names, provide a most efficient and most economical method of conveying bulk materials and provide very satisfactory means for controlling the rate of flow or feed.

The rate of feed of the soil is electrically controlled by a rheostat or dial switch.

The trough, mounted on leaf springs, is vibrated by an electromagnet, causing the bulk material in the trough to flow like water. The vibrator consists generally of an electromagnet energized by a pulsating current.

Guide members 41 are arranged along the path of the belts 24 and 25 to properly guide the plant pot carriers 1.

The operator at the carrier loading station 27 will place the loaded plant pot carriers up against the loaded plant pot carrier which has been previously placed upon the belt 24 so that as the carriers proceed under the vibrating trough 29 there will be a substantially continuous line of plant pots to be filled with soil and the operation of filling the plant pots with soil at station 29 need not be interrupted.

In one form of the invention the end members 5 of the carrier 1 are made thin enough that they permit the last plant pot of one carrier to fit snugly up against the first plant pot of the following container.

As the plant pot carriers 1 with their pots filled with soil proceed to soil compressing station 31 the carriers are picked up by belt 25 whose motion is intermittent but whose velocity is greater during its movement than is the velocity of belt 24.

When belt 25 has moved the carrier to soil compressing station 31 and the carrier containing soil filled pots arrives at its proper location under the soil compressing tool 43 belt 25 stops moving. The stopping of belt 25 is accomplished by providing an electrical micro-switch 45 whose actuating arm 47 is located in the path that the carrier takes and has been engaged by the moving carrier.

As the micro-switch 45 opens the power circuit to the driving mechanism for belt 25, the micro-switch closes the electrical circuit to the power drive of soil compressor 49.

Soil compressor 49 consists of compressing tool 43 connected to a vertical drive shaft 51. Shaft 51 is driven downward and upward for a complete cycle by a cam or crank shaft driven by motor 53 which is in turn controlled by micro-switch 45.

In one form of the invention shaft 51 rides on the top of the driving cam so that the weight of the compression tool 43 and shaft 51 provides the pressure necessary to compress the soil in the pots the required amount.

When shaft 51 has completed a complete cycle the power is removed from motor 53 and applied again to the driving mechanism of belt 25. The carrier whose pot soil has been compressed is then transported to planting station 33.

At planting station 33 the operator puts the slips or seedlings into the holes 55 which are put into the soil at the time the soil is compressed at soil compressing station 31.

In Figure 3 there is shown in cross section an element 56 of soil compressing tool 43. One element 56 is provided for each plant pot in the plant pot carrier. In each element 56 there is located one or more pins 57 to provide depressions or holes 55 in the soil 59 so that the operator at planting station 33 may conveniently insert the seedlings in the soil filled plant pots. In Figure 3 there is also shown a cross section of one of the plant pots 13 filled with soil 59 which has been compressed and into which a single hole 55 has been forced by pin 57.

At station 33 there is located a table 61 which contains a tray 63 of cuttings, clippings, seedlings or the like designated by numeral 65. The operator at station 33 takes the cuttings 65 or the like and inserts them into the holes 55 prepared in the compacted soil. As the operator inserts the cuttings 65, the operator forces the soil snugly about the stem of the cutting 65.

Depending upon the type of plants being raised, one or more of the cuttings 65 may be inserted in each of the holes 55.

When a cutting 65 has been inserted in each hole 55 operator may then remove the carrier from belt 25 and place it on the rack 69 shown in Figure 4.

Rack 69 of Figure 4 contains a plurality of shelves 71. The shelves 71 are separated enough to allow room for the height that the cutting 65 extends above the plant pot.

A lift truck may then remove the loaded rack 69 to the location where the potted plants are to be placed to grow. The carriers may be removed from the racks 69 and placed in their growing location.

At the growing location the carriers may be spaced apart side ways to permit plant growth. This will be found to be an advantage of the single row plant pot carriers as taught by this invention.

It will be seen also that the use of rectangular pots in rows along a line parallel to the greatest dimension of the pot provides space or growing room within the row while spacing between carriers provides growing room between the rows.

In Figure 5 there is shown detail regarding the height of the plant pots 13 with respect to the frame of the plant pot carrier 1. It will be seen that the bottom of the plant pot will rest on the soil 73. The moisture from watering the plants not only goes into the soil 73 in the growing table but provides additional moisture to the plant through capillary action through the bottom of the pot 13.

The plant pot carriers also provide a very efficient and convenient way of removing the pots from the growing tables or area where they are prepared for shipping.

It will be seen that the plant pot carrier provides a convenient holder for plant pots while handling in a planted pot production line, and the arrangement shown provides an efficient manner for potting plants.

Having thus described the invention what is claimed is:

1. Apparatus for potting plants and the like comprising in combination a plant pot carrier of the type for handling a plurality of plant pots having a body and a collar, said collar being at the upper edge of the body of said pot, said collar extending beyond the body of said pot, said carrier comprising in combination a rigid rectangular frame, said frame particularly characterized in that the smaller dimension of the inside of said frame is substantially equal to a horizontal dimension of the body of said plant pot under the collar of the plant pot but less than the corresponding dimension of the collar on said plant pots, the longer dimension of the inside of said rectangular frame being slightly less than a multiple of the horizontal dimension of the collar of said pot perpendicular to said horizontal dimension of said plant pot whereby a plurality of said plant pots will rest snugly in line in said carrier; said rectangular frame having a height less than the height under the collar of said pot, and said frame having a support member across the narrow dimension of the frame and at substantially the center of the frame at its lower edge to prevent spreading of said frame; and wherein said support member is located between the location of two of said pots when said carrier is filled with said pots, means for filling said pots with soil, means for compressing said soil, means for moving said carriers continuously under said means for filling said pots with soil and means for intermittently moving said carriers under said soil compressing means.

2. The apparatus for potting plants and the like as set forth in claim 1 and wherein said intermittently moving means consists of a belt, means for driving said belt and means controlling said belt driving means, said control means responsive to the position of said pot carrier on said belt.

3. The invention as set forth in claim 2 and wherein said means for filling said plant pots with soil consists of a soil storage container and means for continuously applying soil to said plant pots as they are transferred by said belt moving at a substantially uniform rate.

4. The invention as set forth in claim 2 and wherein there is included an electric motor for driving said belt, said electric motor energized by an electric switch, said plant pot carrier located lengthwise on said belt during operation to open said switch with its leading end when said carrier reaches a predetermined location under said soil compressing means.

5. Planting apparatus comprising the combination of a first station, said first station having means for providing a constant flow of soil; a second station, said second station having a plurality of means for soil compression, each of said soil compression means having means for making a hole in the soil which is compressed by said soil compressing means; a third station, said third station having means for planting plants in the holes that have been made in the soil, and conveyor means extending between said stations and wherein said conveyor means includes a first belt moving continuously past said first station and a second belt moving intermittently past said second station and said third station, said first belt and said second belt abutting each other, and means located in the path of said carriers on said second belt moving intermittently to stop the movement of said second belt during the operation of said soil compressing means.

References Cited in the file of this patent

UNITED STATES PATENTS

| | | |
|---|---|---|
| 1,300,629 | Macaw | Apr. 15, 1919 |
| 2,463,719 | Schackett et al. | Mar. 8, 1949 |

FOREIGN PATENTS

| | | |
|---|---|---|
| 543,388 | Germany | Feb. 4, 1932 |
| 599,962 | Great Britain | Mar. 24, 1948 |